US012590015B2

(12) United States Patent
Woo et al.

(10) Patent No.: US 12,590,015 B2
(45) Date of Patent: *Mar. 31, 2026

(54) WATER PURIFIER FILTER AND WATER PURIFIER COMPRISING SAME

(71) Applicant: LG ELECTRONICS INC., Seoul (KR)

(72) Inventors: Suhye Woo, Seoul (KR); Sangduck Lee, Seoul (KR); Jongpil Kim, Seoul (KR); Yuseung Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 637 days.

This patent is subject to a terminal disclaimer.

(21) Appl. No.: 17/927,091

(22) PCT Filed: Apr. 7, 2021

(86) PCT No.: PCT/KR2021/004343
§ 371 (c)(1),
(2) Date: Nov. 22, 2022

(87) PCT Pub. No.: WO2021/235687
PCT Pub. Date: Nov. 25, 2021

(65) Prior Publication Data

US 2023/0227328 A1 Jul. 20, 2023

(30) Foreign Application Priority Data

May 22, 2020 (KR) ........................ 10-2020-0061723
May 22, 2020 (KR) ........................ 10-2020-0061725

(51) Int. Cl.
*C02F 1/00* (2023.01)
*B01D 39/20* (2006.01)
(Continued)

(52) U.S. Cl.
CPC .......... *C02F 1/001* (2013.01); *B01D 39/2062* (2013.01); *B01D 39/2075* (2013.01);
(Continued)

(58) Field of Classification Search
None
See application file for complete search history.

(56) References Cited

U.S. PATENT DOCUMENTS 5,232,595 A * 8/1993 Meyer .................... B01D 29/58 210/493.1
6,274,041 B1 * 8/2001 Williamson ....... B01D 53/0431 210/243
(Continued)

FOREIGN PATENT DOCUMENTS

CN 110668606 1/2020
KR 20-0320020 7/2003
(Continued)

OTHER PUBLICATIONS

Machine translation of CN110668606 (Year: 2025).*
(Continued)

*Primary Examiner* — Jennifer Dieterle
(74) *Attorney, Agent, or Firm* — KED & ASSOCIATES, LLP

(57) ABSTRACT

A filter for a liquid purifier, comprising: a filter housing having an inlet to receive water and an outlet to discharge the water, and a filter module provided in the filter housing, and configured to purify water introduced through the inlet, and to provide the purified water to the outlet, wherein the filter module includes a carbon block having a hollow tube shape by mixing activated carbon, a binder, ferric hydroxide, and titanium oxide, and the binder is mixed at a ratio of 13% to 23% by weight.

22 Claims, 8 Drawing Sheets

(51) Int. Cl.

| | |
|---|---|
| ***B01J 20/02*** | (2006.01) |
| ***B01J 20/20*** | (2006.01) |
| ***B01J 20/28*** | (2006.01) |
| ***C02F 1/28*** | (2023.01) |
| ***C02F 1/42*** | (2023.01) |
| ***C02F 1/52*** | (2023.01) |
| ***C02F 1/70*** | (2023.01) |
| ***C02F 1/72*** | (2023.01) |
| *C02F 101/20* | (2006.01) |
| *C02F 101/22* | (2006.01) |

(52) U.S. Cl.

CPC ....... *B01J 20/0211* (2013.01); *B01J 20/0229* (2013.01); *B01J 20/20* (2013.01); *B01J 20/2803* (2013.01); *C02F 1/281* (2013.01); *C02F 1/283* (2013.01); *C02F 1/288* (2013.01); *C02F 1/42* (2013.01); *C02F 1/5245* (2013.01); *C02F 1/705* (2013.01); *C02F 1/72* (2013.01); *B01D 2239/0407* (2013.01); *C02F 2001/422* (2013.01); *C02F 2101/206* (2013.01); *C02F 2101/22* (2013.01); *C02F 2305/026* (2013.01)

(56) References Cited

U.S. PATENT DOCUMENTS

| | | | | |
|---|---|---|---|---|
| 6,368,504 | B1 * | 4/2002 | Kuennen | B01D 39/2062 210/489 |
| 7,473,362 | B1 * | 1/2009 | Nohren, Jr. | C02F 1/002 210/660 |
| 9,764,965 | B1 * | 9/2017 | Nohren, Jr. | B01D 46/527 |
| 9,808,751 | B2 * | 11/2017 | Moon | B01D 69/08 |
| 2003/0196966 | A1 * | 10/2003 | Hughes | C02F 1/725 210/764 |
| 2004/0206682 | A1 * | 10/2004 | Hamlin | B01D 35/30 210/321.86 |
| 2006/0091013 | A1 * | 5/2006 | Takahashi | B01D 61/48 204/632 |
| 2011/0139726 | A1 * | 6/2011 | Jin | B01D 39/06 210/764 |
| 2012/0292247 | A1 | 11/2012 | Moon et al. | |
| 2013/0292323 | A1 * | 11/2013 | Pradeep | C02F 1/003 210/446 |
| 2014/0120148 | A1 * | 5/2014 | Chis | C02F 1/288 424/409 |
| 2016/0023922 | A1 | 1/2016 | Addiego et al. | |
| 2016/0346715 | A1 | 12/2016 | Koonce et al. | |
| 2019/0389740 | A1 | 12/2019 | Choi et al. | |
| 2023/0242414 | A1 * | 8/2023 | Woo | B01D 39/2062 210/256 |

FOREIGN PATENT DOCUMENTS

| | | |
|---|---|---|
| KR | 10-2008-0009260 | 1/2008 |
| KR | 10-2016-0075044 | 6/2016 |
| KR | 10-2017-0079162 | 7/2017 |
| KR | 10-2018-0064841 | 6/2018 |
| KR | 10-1988947 | 6/2019 |
| KR | 10-2019-0090655 | 8/2019 |

OTHER PUBLICATIONS

Korean Office Action dated Oct. 21, 2024 issued in Application No. 10-2020-0061723.

Korean Office Action dated Apr. 5, 2024 issued in Application No. 10-2020-0061723.

International Search Report (with English Translation) dated Jul. 21, 2021 issued in Application No. PCT/KR2021/004343.

Korean Office Action dated Aug. 19, 2022 issued in KR Application No. 10-2020-0061723.

* cited by examiner

WATER PURIFIER FILTER AND WATER PURIFIER COMPRISING SAME

CROSS-REFERENCE TO RELATED PATENT APPLICATIONS

This application is a U.S. National Stage Application under 35 U.S.C. § 371 of PCT Application No. PCT/KR2021/004343, filed Apr. 7, 2021, which claims priority to Korean Patent Application No. 10-2020-0061723, filed May 22, 2020 and Korean Patent Application No. 10-2020-0061725, filed May 22, 2020, whose entire disclosures are hereby incorporated by reference.

TECHNICAL FIELD

The present invention relates to a filter for a water purifier in which a carbon block is provided, and a water purifier including the same.

BACKGROUND ART

A water purifier refers to a device that purifies raw water such as tap water or groundwater. That is, the water purifier refers to a device for converting raw water into drinking water through various purification methods to provide the drinking water. To generate purified water, processes such as precipitation, filtration, and sterilization may be performed, and thus harmful substances are generally removed through these processes.

A water purifier may be provided with various filters to purify raw water. The filters may be classified into a sediment filter, an activated carbon filter, a UF hollow fiber membrane filter, an RO membrane filter, and the like according to their functions.

The sediment filter may be called a filter for precipitating contaminants or suspended materials with large particles in the raw water, and the activated carbon filter may be called a filter for adsorbing and removing contaminants with small particles, residual chlorine, volatile organic compounds or odor generating factors.

The activated carbon filter may be provided with two filters. That is, the activated carbon filter may be provided with a pre-activated carbon filter provided at a raw water-side and a post-activated carbon filter may be provided at a purified water-side. The post-activated carbon filter may be provided to improve the taste of water by removing odor-causing substances that mainly affect the taste of purified water.

The UF hollow fiber membrane filter and the RO membrane filter are generally used selectively.

The demand for water purifiers may be significantly increasing. Therefore, there is a limitation that various requirements are generated, and it is difficult to satisfy the various requirements at the same time. As an example, heavy metals may be removed by applying the RO membrane filter, but there is a limitation that it may be difficult to secure a flow rate of the purified water. That is, there is a limitation that it takes a lot of time to obtain a desired amount of purified water. On the other hand, in the example of the UF hollow fiber membrane filter, a high flow rate may be secured. However, since it may be difficult to remove heavy metals in water, there is a limitation that it is difficult to use groundwater or tap water in a contaminated area such as raw water.

The removal of the heavy metals and the securing of the high flow rate are inevitably recognized as contradictory problems. This is because it is difficult to secure the high flow rate when using the RO membrane filter to remove the heavy metals, and it is difficult to remove the heavy metals when using the UF hollow fiber membrane filter to secure the high flow rate.

In an example disadvantageous arrangement, a filter for removing heavy metals has been manufactured for the purpose of removing seven types of heavy metals (including arsenic (As), cadmium (Cd), lead (Pb), aluminum (Al), mercury (Hg), iron (Fe), and copper (Cu)).

However, a filter may be required for removing eleven types of heavy metals including selenium (Se), chromium (Cr), manganese (Mn), and zinc (Zn) in addition to the seven types of heavy metals.

In the example of the water purifier filter according to the disadvantageous arrangement, there may be limitations that it is insufficient to completely remove the seven kinds of heavy metals while ensuring a high flow rate, as well as not removing selenium (Se), chromium (Cr), manganese (Mn), zinc (Zn) etc. in water.

In the example of the disadvantageous arrangements, there may be a limitation that a particle size of a binder mixed in the filter is large to cause flow resistance, and a mixing amount of the binder occupies a large proportion, and permeability of water is lowered. That is, there is a limitation that the effective water purification amount is lowered.

In the example of the disadvantageous arrangements, a mixing ratio of the activated carbon and the heavy metal removal material mixed in the filter is not sufficient, and there may be a limitation that the heavy metal removal rate is limited.

Technical Problem

The present invention may provide a filter for a water purifier which is capable of effectively removing heavy metals in water, which include selenium (Se), chromium (Cr), manganese (Mn), and zinc (Zn) in water, and a water purifier including the same.

The present invention may provide a filter for a water purifier which is capable of removing heavy metals such as lead, mercury, arsenic, iron, aluminum, copper and cadmium in water while securing a treatment capacity, and a water purifier including the same.

The present invention may provide a filter for a water purifier which is capable of removing at least nine kinds of heavy metals and a water purifier including the same.

The present invention may provide a filter for a water purifier which is capable of being directly applied to an existing water purifier without changing a shape or arrangement structure of a filter applied to the water purifier, and a water purifier including the same.

The present invention may provide a filter for a water purifier in which heterogeneous filters are disposed in a filter housing in a transverse direction to reduce a volume of the filters, thereby improving space utilization, and a water purifier including the same.

The present invention may provide a filter for a water purifier in which heterogeneous filters are disposed in a filter housing in a longitudinal direction to reduce a volume of the filters, thereby improving space utilization, and a water purifier including the same.

Technical Solution

A filter for a water purifier according to an embodiment includes a filter housing provided with an inlet and an outlet, and a filter module provided in the filter housing to purify water introduced through the inlet, thereby supplying the purified water to the outlet, wherein the filter module includes a carbon block having a hollow tube shape, which is prepared by mixing activated carbon, a binder, ferric hydroxide, and titanium oxide.

The binder may be mixed at a ratio of 13% to 23% by weight.

The carbon block may be prepared by containing 18% to 28% by weight of the activated carbon, 13% to 23% by weight of the binder, 15% to 30% by weight of the ferric hydroxide, and 30% to 45% by weight of the titanium oxide.

The carbon block may include a first carbon block disposed inside and a second carbon block disposed to surround the outside of the first carbon block.

An outer diameter of the first carbon block and an inner diameter of the second carbon block may be the same.

The first carbon block and the second carbon block may have composition ratios different from each other.

The first carbon block may be prepared by containing 10% to 20% by weight of the activated carbon, 13% to 23% by weight of the binder, 10% to 57% by weight of the ferric hydroxide, and 10% to 57% by weight of the titanium oxide, and the second carbon block may be prepared by containing 23% to 33% by weight of the activated carbon, 13% to 23% by weight of the binder, 8% to 46% by weight of the ferric hydroxide, and 8% to 46% by weight of the titanium oxide.

The carbon block may be prepared by containing 20% to 28% by weight of the activated carbon, 13% to 23% by weight of the binder, 14% to 24% by weight of the ferric hydroxide, and 33% to 43% by weight of the titanium oxide.

The filter may further include an anion exchange resin nonwoven fabric configured to surround an outside of the carbon block.

An inner space of the filter housing may be divided into a first space portion defined in a lower portion thereof so that the water introduced into the filter housing is introduced and a second space portion defined above the first space portion so that the water passing through the first space portion is introduced.

The carbon block may include a third carbon block accommodated in the first space portion and a fourth carbon block accommodated in the second space portion.

The third carbon block and the fourth carbon block may have composition ratios different from each other.

The third carbon block may be prepared by containing 20% to 30% by weight of the activated carbon, 13% to 23% by weight of the binder, 29% to 39% by weight of the ferric hydroxide, and 18% to 28% by weight of the titanium oxide, and the fourth carbon block may be prepared by containing 20% to 30% by weight of the activated carbon, 13% to 23% by weight of the binder, 12% to 22% by weight of the ferric hydroxide, and 35% to 45% by weight of the titanium oxide.

The first space portion may be filled with an anion exchange resin in the form of particles, and the carbon block may be accommodated in the second space portion.

The carbon block may be prepared by containing 25% to 30% by weight of the activated carbon, 13% to 23% by weight of the binder, 27% to 37% by weight of the iron hydroxide, and 25% to 30% by weight of the titanium oxide.

The titanium oxide may include titanium dioxide ($TiO_2$) or titanium ($Na_4TiO_4$).

A filter for a water purifier according to another embodiment includes a filter housing provided with an inlet and an outlet, and a filter module provided in the filter housing to purify water introduced through the inlet, thereby supplying the purified water to the outlet, wherein the filter module includes a carbon block having a hollow tube shape, which is prepared by mixing activated carbon, a binder, ferric hydroxide, titanium oxide, and zero valent iron.

The block may be prepared by containing 25% to 35% by weight of the activated carbon, 13% to 23% by weight of the binder, 5% to 15% by weight of the iron hydroxide, 18% to 28% by weight of the titanium oxide, and 10% to 20% by weight of the zero valent iron.

The carbon block may include a first carbon block disposed inside and a second carbon block disposed to surround the outside of the first carbon block.

An outer diameter of the first carbon block and an inner diameter of the second carbon block may be the same.

The first carbon block and the second carbon block may have composition ratios different from each other.

The second carbon block may be prepared by containing 25% to 35% by weight of the activated carbon, 13% to 23% by weight of the binder, 1% to 10% by weight of the ferric hydroxide, 1% to 10% by weight of the titanium oxide, and 37% to 47% by weight of the zero valent iron.

The first carbon block may be prepared by containing 25% to 35% by weight of the activated carbon, 13% to 23% by weight of the binder, 10% to 20% by weight of the ferric hydroxide, and 32% to 42% by weight of the titanium oxide.

The filter may further include an anion exchange resin nonwoven fabric configured to surround an outside of the carbon block.

An inner space of the filter housing may be divided into a first space portion defined in a lower portion thereof so that the water introduced into the filter housing is introduced and a second space portion defined above the first space portion so that the water passing through the first space portion is introduced.

The carbon block may include a third carbon block accommodated in the first space portion and a fourth carbon block accommodated in the second space portion.

The third carbon block and the fourth carbon block may have composition ratios different from each other.

The third carbon block may be prepared by containing 18% to 28% by weight of the activated carbon, 13% to 23% by weight of the binder, 9% to 15% by weight of the iron hydroxide, 18% to 28% by weight of the titanium oxide, and 15% to 25% by weight of the zero valent iron.

The fourth carbon block may be prepared by containing 20% to 30% by weight of the activated carbon, 13% to 23% by weight of the binder, 10% to 20% by weight of the iron hydroxide, and 37% to 47% by weight of the titanium oxide.

The first space portion may be filled with an anion exchange resin in the form of particles, and the carbon block may be accommodated in the second space portion.

The titanium oxide may include titanium dioxide ($TiO_2$) or titanium ($Na_4TiO_4$).

A water purifier according to the present invention include the above-described filter of the water purifier.

Advantageous Effects

According to the present invention, there may be the effect capable of removing the heavy metals such as lead, mercury, arsenic, iron, aluminum, copper, and cadmium in water while securing the treatment capacity.

According to the present invention, there may be the effect capable of removing at least nine kinds of heavy metals.

In addition, there may be the effect capable of reliably removing the heavy metals in water containing chromium (Cr), selenium (Se), manganese (Mn), and zinc (Zn) in water.

According to the present invention, there may be the effect that the water purification process is performed several times by the plurality of filters to more reliably remove the various foreign substances in addition to the heavy metals.

According to the present invention, there may be the effect that, since only the material of the filter is changed, and the shape or arrangement structure of the filter applied to the water purifier is not changed, the filter is capable of being directly applied to the existing water purifier.

According to the present invention, there may be the effect that the heterogeneous filters are in the one filter housing in the transverse to reduce the volume of the filters, thereby improving the space utilization and more realizing the slimness of the water purifier.

According to the present invention, there may be the effect that the heterogeneous filters are in the one filter housing in the longitudinal direction to reduce the volume of the filters, thereby improving the space utilization and more realizing the slimness of the water purifier.

BRIEF DESCRIPTION OF THE DRAWINGS

Arrangements and embodiments of the present disclosure may become apparent from the detailed description of the following aspects in conjunction with the accompanying drawings, in which.

DETAILED DESCRIPTION

Hereinafter, specific embodiments may be described in detail with reference to the accompanying drawings. Embodiments may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings attached to the following embodiments are embodiments of the scope of the invention, but to facilitate understanding within the scope of the present invention, in the description of the fine portions, the drawings may be expressed differently according to the drawings, and the specific portions may not be displayed according to the drawings, or may be exaggerated according to the drawings.

Figure 1:
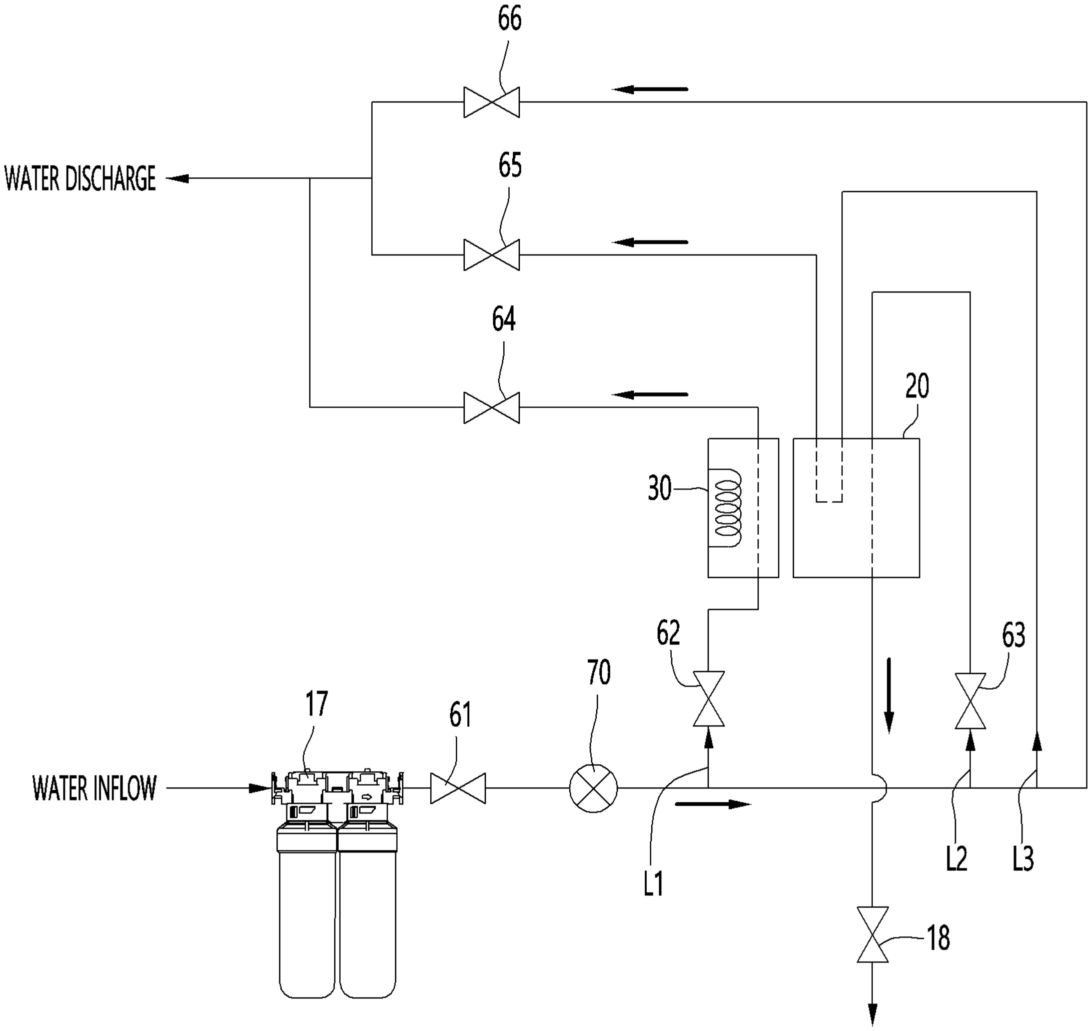
FIG. 1 is a water pipe diagram of a water purifier according to an embodiment of the present invention.

FIG. 1 is a water pipe diagram of a water purifier according to an embodiment of the present invention. The following disclosure may describe use of water and/or a water purifier. However, embodiments may relate to another liquid and/or a liquid purifier. A water purifier (or liquid purifier) according to the present invention may be configured to purify water (liquid) directly supplied from an external water source to cool or heat the water to be dispensed. For example, the water purifier may be a direct type hot and cold water purifier (or liquid purifier).

The direct type water purifier represents a water purifier in which water is dispensed when a user performs a water dispensing operation without having a water tank in which purified water is stored.

The water purifier may be formed integrally with a refrigerator, for example. The water purifier may be provided with an undersink-type water purifier in which a main body is installed under a sink, and a water outlet is installed outside the sink.

Referring to FIG. 1, in the water purifier according to an embodiment of the present invention, a water supply line L may be disposed from a water supply source (or liquid source) to the water outlet of the water purifier, and various valves and water purifying components may be connected to the water supply line L. Embodiments may also relate to liquid purification based on a liquid.

The water supply line is connected to the water supply source (e.g., a faucet in the home), and a filter assembly 17 may be disposed at any point of the water supply line to filter foreign substances contained in drinking water supplied from the water supply source.

A water supply valve 61 and a flow rate sensor 70 are successively disposed on the water supply line L connected to an outlet end of the filter assembly 17. Thus, when an amount of supplied water, which is detected by the flow rate sensor 70, reaches a set flow rate, the water supply valve 61 may be controlled to be closed.

A water supply line L1 for supplying hot water, a water supply line L3 for supplying cold water, and/or a water supply line L2 for supplying cold water may be branched from any points of the water supply line L extending from the outlet end of the water flow sensor 70.

A purified water dispensing valve 66 may be mounted on an end of the water supply line L extending from the outlet end of the flow rate sensor 70. A hot water dispensing valve 64 may be mounted on an end of the water supply line L1 for supplying the hot water. A cold water dispensing valve 65 may be mounted on an end of the water supply line L3 for supplying the cold water. A cold water valve 63 may be mounted at any point of the water supply line L2 for supplying the cold water. The cold water valve 63 adjusts an amount of cold water to be supplied to the cold water generating unit 20 (or cold water generator).

All the water supply lines extending from outlet ends of the hot water dispensing valve 64, the cold water dispensing valve 65, and the purified water dispensing valve 66 are connected to the water outlet. As shown in the drawing, the purified water, the cold water, and the hot water may be dispensed through a single dispensing hole. In some examples, the purified water, the cold water, and the hot water may be dispensed through independent dispensing holes, respectively.

A process of supplying cold water and hot water may be described. In an example of cold water, when the cold water valve 63 is opened to supply cold water to the cold water generating unit 20, water of the water supply line L3 for supplying cold water, which passes through the cold water generating unit 20, may be cooled by coolant to generate cold water.

A refrigerant cycle for cooling the coolant may be provided in the water supply line L2 for supplying the cold water. The refrigerant cycle may include a compressor, a condenser, an expansion valve, and an evaporator, for example.

Thereafter, when a cold water selection button of a manipulation display unit (or display) is pushed to open the cold water dispensing valve 65, the cold water may be dispensed through the water outlet.

In an example of hot water, water flowing along the water supply line L1 for supplying the hot water may be heated by a hot water heater 30 to generate the hot water. When a hot water selection button of the manipulation display unit (or display) is pushed to open the hot water dispensing valve 64, the hot water may be dispensed through the water outlet.

The water purifier having the above-described configuration according to an embodiment of the present invention may include at least one water purifier filter (or liquid purifier filter) to generate purified water from raw water. The water purifier filter may be described with reference to following description.

Figure 3:
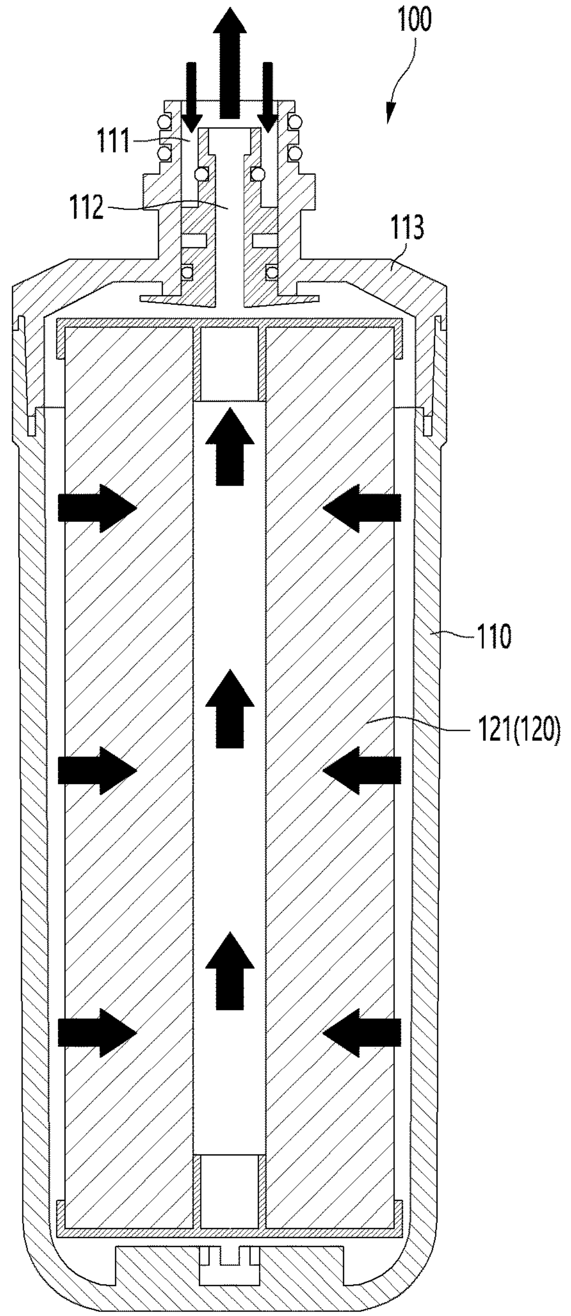
FIG. 3 is a cross-sectional view of a carbon filter according to an embodiment of the present invention.
Figure 2:
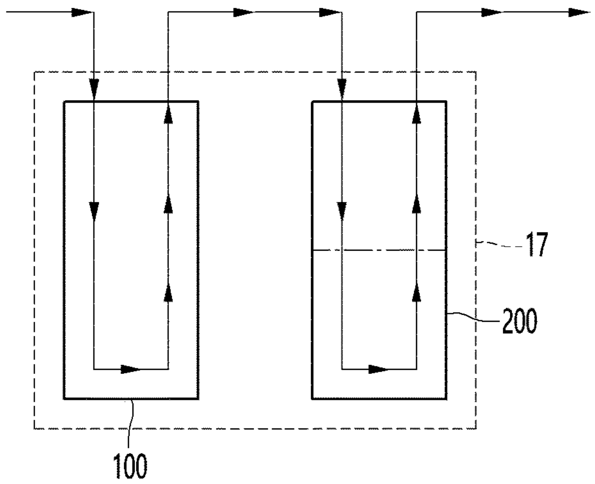
FIG. 2 is a conceptual view of a filter assembly that is a portion of components of the present invention.

FIG. 2 is a conceptual view of a filter assembly that is a portion of components of the present invention. FIG. 3 is a cross-sectional view of a carbon filter according to an embodiment of the present invention.

The filter assembly 17 may include at least one carbon filter 100. The filter assembly 17 may include at least one composite filter 200. The filter assembly 17 may include at least one carbon filter 100 and a composite filter 200. The filter assembly 17 may be constituted by only a plurality of carbon filters 100 or may be constituted by only a plurality of composite filters 200.

Referring to FIGS. 2 to 3, a filter for a water purifier (hereinafter referred to as a filter assembly) according to an embodiment of the present invention may include a carbon filter 100 including a carbon block 121 having a hollow tube shape. The carbon filter 100 may include a filter housing 110 and a filter module 120. The filter housing 110 may include an inlet 111 and an outlet 112. Water required to be purified is introduced through the inlet 111, and the purified water is discharged from the outlet 112. Thus, water is purified by the filter module 120 disposed between the inlet 111 and the outlet 112 while flowing between the inlet 111 and the outlet 112.

The filter housing 110 may define a space in which the filter module 120 is accommodated and may include an upper cap 113 in which the inlet 111 and the outlet 112 are provided. In this example, a space portion of the filter housing 110 may communicate with the outside through the inlet 111 and the outlet 112 of the upper cap 113.

When the upper cap 113 is provided as described above, the filter module 120 may be easily mounted in the space portion of the filter housing 110 by opening the upper cap 113, and thus the filter module 120 may be easily replaced.

Water introduced into the filter housing 110 through the inlet 111 may be purified while passing through the filter module 120. That is, foreign substances (e.g., heavy metals) contained in raw water such as tap water (or other liquid) may be removed while passing through the filter module 120.

According to the present embodiment, a filter for a water purifier may be provided that is excellent in removing the heavy metals in water, and a water purifier having the same.

First Embodiment

The filter module 120 may include the carbon block 121 prepared by mixing activated carbon, a binder, ferric hydroxide, and titanium oxide to mold a mixture into a hollow block shape.

The titanium oxide may include titanium dioxide ($TiO_2$) or titanium ($Na_4TiO_4$). The activated carbon, the binder, the ferric hydroxide, and the titanium oxide may be mixed at various composition ratios. The binder may be mixed at a ratio of 13% to 23% by weight.

As one example, the carbon block 121 may be prepared by containing 18% to 28% by weight of the activated carbon, 13% to 23% by weight of the binder, 15% to 30% by weight of the ferric hydroxide, and 30% to 45% by weight of the titanium oxide.

The titanium oxide may include titanium dioxide or titanium tetraoxide. the titanium oxide has a functional group in which a plurality of oxygen (O) is covalently bonded to one titanium (Ti). For example, sodium orthotitanate ($Na_4TiO_4$), which is a type of titanium oxide, may remove (ion adsorption) heavy metals in water through a chemical reaction such as following Formula (1).

$$Na_4TiO_4+2Me^{++}\rightarrow Me_2TiO_4+4Na^+ \quad \text{Formula (1)}$$

In Formula (1), 'Me' means a heavy metal, and the heavy metal is dissolved in water in the form of a water-soluble compound.

Due to the chemical reaction between the water-soluble heavy metal compound and the sodium orthotitanate ($Na_4TiO_4$), purified water from which the heavy metal (Me) is removed is discharged to the outside of the filter housing 110 through the outlet 112.

For example, 'Me' may correspond to cadmium (Cd). In this example, sodium orthotitanate ($Na_4TiO_4$) may remove (ion adsorption) cadmium (Cd) in water through a chemical reaction such as the following Formula (2).

$$Na_4TiO_4+2Cd^{++}\rightarrow Cd_2TiO_4+4Na^+ \quad \text{Formula (2)}$$

The titanium oxide may have a granular or powder form and may be mixed with the materials of the carbon block 121 to constitute the carbon block 121. Therefore, when the water containing the heavy metal passes through the filter module 120, the heavy metal in the water may be removed.

Additionally, the titanium dioxide may remove (ion adsorption) manganese in water through a chemical reaction such as following Formula (3).

$$Mn^{2+}+Ti_2O(OH)_2\rightarrow Ti_2O(O_2Mn)+2H^+ \quad \text{Formula (3)}$$

Additionally, the titanium dioxide may remove (ion adsorption) zinc in water through a chemical reaction such as following Formula (4).

$$Zn^{2+}+Ti_2O(OH)_2\rightarrow Ti_2O(O_2Zn)+2H^+ \quad \text{Formula (4)}$$

Additionally, the titanium dioxide may remove (ion adsorption) chromium and selenium in water through a chemical reaction such as following Formula (5).

Formula (5)

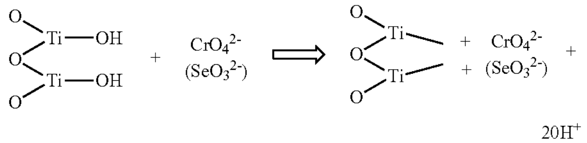

Additionally, the carbon block 121 may include ferric hydroxide. The ferric hydroxide may mean a synthetic ferric hydroxide (α-FeOOH) compound. The synthetic ferric hydroxide (α-FeOOH) compound may include a functional group represented by following Formula (6).

Formula (6)

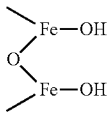

The synthetic ferric hydroxide (α-FeOOH) compound may include a functional group in which each of a plurality of iron (Fe) is bonded to a hydroxyl group (—OH), and each iron (Fe) is ionic or covalently bonded to one oxygen (O). As an example of such a synthetic ferric hydroxide (α-FeOOH) compound, the trade name 'Bayoxide E33'CF provided by Lanxess may be used.

The synthetic ferric hydroxide (α-FeOOH) compound may remove heavy metals in water through a chemical reaction such as following Formula (7).

Formula (7)

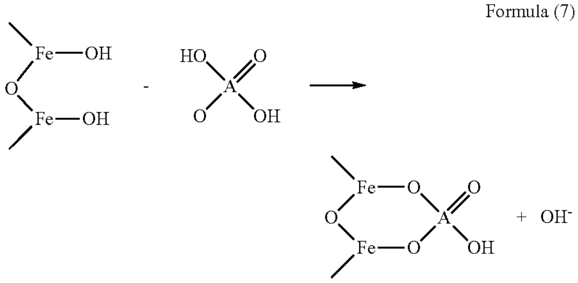

Here, 'A' means a heavy metal, and the heavy metal may be dissolved in water in the form of a water-soluble compound.

As described above, when the water-soluble heavy metal compound and the synthetic ferric hydroxide (α-FeOOH) compound undergo a chemical reaction, water and hydroxide ions are generated. Additionally, a heavy metal A has a strong ionic or covalent bond with the synthetic ferric hydroxide (α-FeOOH) compound. Therefore, the removed heavy metal A is prevented from being dissolved in water again. The purified water from which the heavy metal A is removed through the filter module 120 is discharged to the outside of the filter housing 110 through the outlet 112. For example, the heavy metal A may be 'arsenic'.

For reference, the ferric hydroxide may remove cadmium (Cd) in water through a chemical reaction such as following Formula (8).

$2Fe^{2+}+Cd^{2++4}OH^{-}\text{->}CdFe_2O_4+2H_2$ Formula (8)

Additionally, the ferric hydroxide may remove chromium and selenium in water through a chemical reaction such as following Formula (9).

Formula (9)

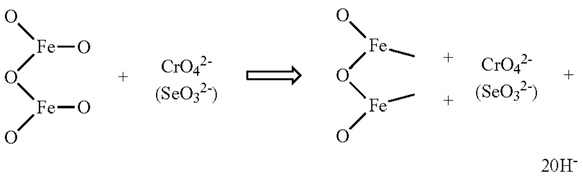

The synthetic ferric hydroxide (α-FeOOH) compound may have a granular or powder form and may be mixed with a binder as a material of the carbon block 121 to constitute the carbon block 121.

The carbon block 121 may further include activated carbon. The activated carbon may be provided in the form of granular or powder. As described above, when the carbon block 121 includes activated carbon, the carbon block 121 may effectively remove heavy metals in water and also residual chlorine components in water. Thus, the taste of water may be improved.

Chloroform ($CHCL_3$) in water may be effectively removed by the activated carbon.

The binder connects activated carbon, titanium oxide, and ferric hydroxide to each other and is mixed to give rigidity. Due to the configuration of the binder, activated carbon, titanium oxide, and ferric hydroxide may be processed in the form of a block having rigidity.

As one example, the filter module 120 may be provided by mixing the above-mentioned materials uniformly and then putting the mixture in a mold to heat the mixture. The binder (e.g., polyethylene (PE)) is melted by being heated in the mold, and activated carbon, titanium oxide, and ferric hydroxide are coupled. Thus, the carbon block 121 in the form of the block having rigidity as a whole may be provided.

In the water purifier (or liquid purifier), several filters are already installed to remove heavy metals and various foreign substances in the water. If the several filters are installed, water purification performance may be secured, but a flow rate of the purified water may be inevitably reduced.

Since a space in which the filter is installed is limited in the existing water purifier, it is not easy to add a new filter, and each filter (e.g., activated carbon filter) installed in the water purifier basically has an individual function to improve the water purification performance, and thus it is not preferable that the existing filter is omitted to add a new filter.

In the example of the present invention, the carbon block 121 may be provided by mixing activated carbon, titanium oxide, and ferric hydroxide. Therefore, even heavy metals in water may be removed without increasing in a total number of filters while maintaining the unique functions and effects of the activated carbon filter installed in the existing water purifier. Since the number of filters does not increase, the flow rate of the purified water may be prevented from decreasing.

In this embodiment, the carbon block 121 may have an outer diameter of 45 mm to 57 mm. The carbon block 21 may have an inner diameter of 12 mm to 15 mm. The carbon block 21 may also have a length of 145 mm to 210 mm.

The carbon block 121 may have a weight of 190 g to 330 g. The first carbon block 122 may be prepared by containing 34 g to 92 g of activated carbon, 25 g to 76 g of a binder, 29 g to 99 g of ferric hydroxide, and 57 g to 149 g of titanium oxide.

The filter for the water purifier may include a plurality of carbon filters 100 which are shown in FIG. 3 and disposed in series.

According to the present invention, as raw water introduced into the filter housing 110 passes through the block 121, heavy metals may be removed, and thus the water may be purified.

Second Embodiment

As another example, the filter module 120 may include the carbon block 121 prepared by mixing activated carbon, a binder, iron hydroxide, titanium oxide, and zero valent iron to mold a mixture into a hollow block shape.

The titanium oxide may include titanium dioxide ($TiO_2$) or titanium ($Na_4TiO_4$). The activated carbon, the binder, the iron hydroxide, the titanium oxide, and the zero valent iron may be mixed at various composition ratios.

As one example, the carbon block 121 is prepared by containing 25% to 35% by weight of the activated carbon, 13% to 23% by weight of the binder, 5% to 15% by weight of the iron hydroxide, 18% to 28% by weight of the titanium oxide, and 10% to 20% by weight of the zero valent iron.

The titanium oxide may include titanium dioxide or titanium tetraoxide. The titanium oxide has a functional group in which a plurality of oxygen (O) is covalently bonded to one titanium (Ti).

For example, sodium orthotitanate ($Na_4TiO_4$), which is a type of titanium oxide, may remove (ion adsorption) heavy metals in water through a chemical reaction such as following Formula (1).

$Na_4TiO_4+2Me^{++}\rightarrow Me_2TiO_4+4Na^+$ Formula (1)

In Formula (1), 'Me' means a heavy metal, and the heavy metal is dissolved in water in the form of a water-soluble compound.

Due to the chemical reaction between the water-soluble heavy metal compound and the sodium orthotitanate ($Na_4TiO_4$), purified water from which the heavy metal (Me) is removed is discharged to the outside of the filter housing 110 through the outlet 112.

For example, 'Me' may correspond to cadmium (Cd). In this example, sodium orthotitanate ($Na_4TiO_4$) may remove (ion adsorption) cadmium (Cd) in water through a chemical reaction such as following the Formula (2).

$Na_4TiO_4+2Cd^{++}\rightarrow Cd_2TiO_4+4Na^+$ Formula (2)

The titanium oxide may have a granular or powder form and may be mixed with the materials of the carbon block 121 to constitute the carbon block 121. Therefore, when the water containing the heavy metal passes through the filter module 120, the heavy metal in the water may be removed.

Additionally, the titanium dioxide may remove (ion adsorption) manganese in water through a chemical reaction such as following Formula (3).

$Mn^{2+}+Ti_2O(OH)_2\rightarrow Ti_2O(O_2Mn)+2H^+$ Formula (3)

Additionally, the titanium dioxide may remove (ion adsorption) zinc in water through a chemical reaction such as following Formula (4).

$Zn^{2+}+Ti_2O(OH)_2\rightarrow Ti_2O(O_2Zn)+2H^+$ Formula (4)

Additionally, the titanium dioxide may remove (ion adsorption) chromium and selenium in water through a chemical reaction such as following Formula (5).

Formula (5)

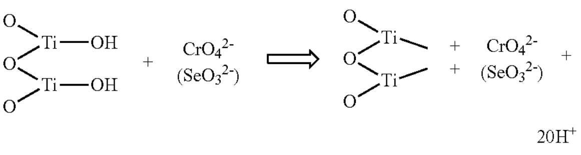

Additionally, the carbon block 121 may include ferric hydroxide. The ferric hydroxide may mean a synthetic ferric hydroxide (α-FeOOH) compound. The synthetic ferric hydroxide (α-FeOOH) compound may include a functional group represented by following Formula (6).

Formula (6)

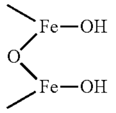

The synthetic ferric hydroxide (α-FeOOH) compound may include a functional group in which each of a plurality of iron (Fe) is bonded to a hydroxyl group (—OH), and each iron (Fe) is ionic or covalently bonded to one oxygen (O). As an example of such a synthetic ferric hydroxide (α-FeOOH) compound, the trade name 'Bayoxide E33HCF' provided by LanXess may be used. The synthetic ferric hydroxide (α-FeOOH) compound may remove heavy metals in water through a chemical reaction such as following Formula (7).

Formula (7)

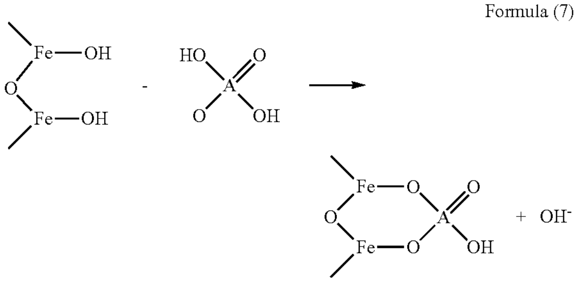

Here, 'A' means a heavy metal, and the heavy metal may be dissolved in water in the form of a water-soluble compound.

As described above, when the water-soluble heavy metal compound and the synthetic ferric hydroxide (α-FeOOH) compound undergo a chemical reaction, water and hydroxide ions are generated. Additionally, a heavy metal A has a strong ionic or covalent bond with the synthetic ferric hydroxide (α-FeOOH) compound. Therefore, the removed heavy metal A is prevented from being dissolved in water again. The purified water from which the heavy metal A is removed through the filter module 120 is discharged to the outside of the filter housing 110 through the outlet 112. For example, the heavy metal A may be 'arsenic'.

For reference, the ferric hydroxide may remove cadmium (Cd) in water through a chemical reaction such as following Formula (8)

$2Fe^{2+}+Cd^{2++4}OH^{-}$->$CdFe_2O_4+2H_2$ Formula (8).

The ferric hydroxide may remove chromium and selenium in water through a chemical reaction such as following Formula (9).

Formula (9)

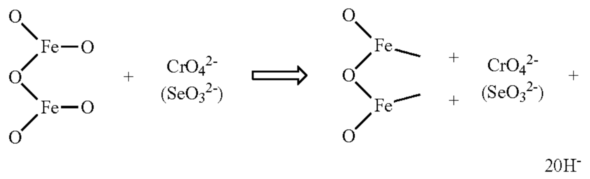

The synthetic ferric hydroxide (α-FeOOH) compound may have a granular or powder form and may be mixed with a binder as a material of the carbon block 121 to constitute the carbon block 121.

The carbon block 121 may further include zero valent iron. The zero valent iron ZVI means a reactive metal having a standard redox potential (E0=−0.44V). In addition, the zero-valent iron is an effective reduction that reacts well with oxidized heavy metals such as hexavalent chromium.

Oxidation reaction in water may be carried out as in following Formula 10 to Formula 13 of the zero valent iron.

$$2Fe0_{(s)}+O_2+2H_2O \rightarrow 2Fe^{2+}+4OH^- \quad \text{Formula (10)}$$

$$4Fe^{2+}+O_2+2H_2O \rightarrow 4Fe^{3+}+4OH^- \quad \text{Formula (11)}$$

$$Fe^{2+}+2OH^- \rightarrow Fe(OH)_{2(S)} \quad \text{Formula (12)}$$

$$Fe^{3+}+2OH \rightarrow Fe(OH)_{3(S)} \quad \text{Formula (13)}$$

Figure 4:
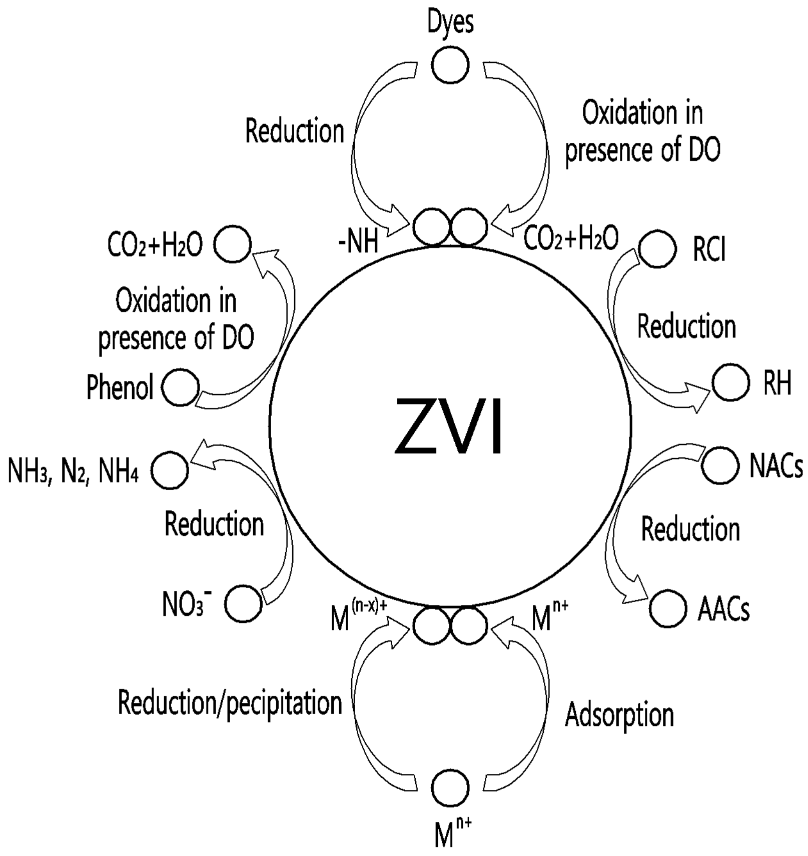
FIG. 4 is a view illustrating a mechanism for removing contaminants of zero valent iron.
Figure 5:
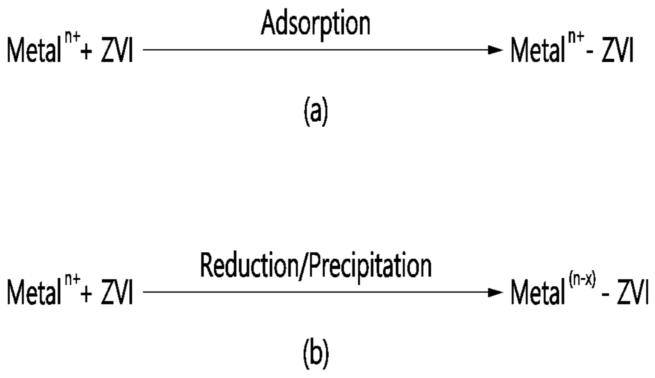
FIG. 5 is a view illustrating a mechanism for removing heavy metals of zero valent iron.

FIG. 4 is a view illustrating a mechanism for removing contaminants of the zero valent iron. FIG. 5 is a view illustrating a mechanism for removing heavy metals of the zero valent iron.

The zero valent iron may remove contaminants and heavy metals by the same mechanism as in FIGS. 4 and 5.

The carbon block 121 may include activated carbon. The activated carbon may be provided in the form of granular or powder. As described above, when the carbon block 121 includes activated carbon, the carbon block 121 may effectively remove heavy metals in water and also residual chlorine components in water. Thus, the taste of water may be improved.

Chloroform ($CHCL_3$) in water may be effectively removed by the activated carbon.

The binder connects activated carbon, titanium oxide, and ferric hydroxide to each other and is mixed to give rigidity. Due to the configuration of the binder, activated carbon, titanium oxide, and ferric hydroxide may be processed in the form of a block having rigidity.

As one example, the filter module 120 may be provided by mixing the above-mentioned materials uniformly and then putting the mixture in a mold to heat the mixture. The binder (e.g., polyethylene (PE)) is melted by being heated in the mold, and activated carbon, titanium oxide, and ferric hydroxide are coupled. Thus, the carbon block 121 in the form of the block having rigidity as a whole may be provided.

In the water purifier (or liquid purifier), several filters are already installed to remove heavy metals and various foreign substances in the water. If the several filters are installed, water purification performance may be secured, but a flow rate of the purified water may be inevitably reduced.

Since a space in which the filter is installed is limited in the existing water purifier, it is not easy to add a new filter, and each filter (e.g., activated carbon filter) installed in the water purifier basically has an individual function to improve the water purification performance, and thus it is not preferable that the existing filter is omitted to add a new filter.

In the example of the present invention, the carbon block 121 may be provided by mixing activated carbon, titanium oxide, and ferric hydroxide. Therefore, even heavy metals in water may be removed without increasing in a total number of filters while maintaining the unique functions and effects of the activated carbon filter installed in the existing water purifier. Since the number of filters does not increase, the flow rate of the purified water may be prevented from decreasing.

In this embodiment, the carbon block 121 may have an outer diameter of 48 mm to 57 mm. The carbon block 21 may have an inner diameter of 12 mm to 15 mm. The carbon block 21 may have a length of 145 mm to 210 mm.

The carbon block 121 may have a weight of 160 g to 310 g. The carbon block 121 may be prepared by containing 40 g to 109 g of activated carbon, 21 g to 71 g of a binder, 8 g to 47 g of ferric hydroxide, 29 g to 87 g of titanium oxide, and 16 g to 62 g of zero valent iron.

The filter for the water purifier may include a plurality of carbon filters 100 which are shown in FIG. 3 and disposed in series.

According to the present invention as described above, as raw water introduced into the filter housing 110 passes through the block 121, heavy metals may be removed, and thus the water may be purified.

Figure 6:
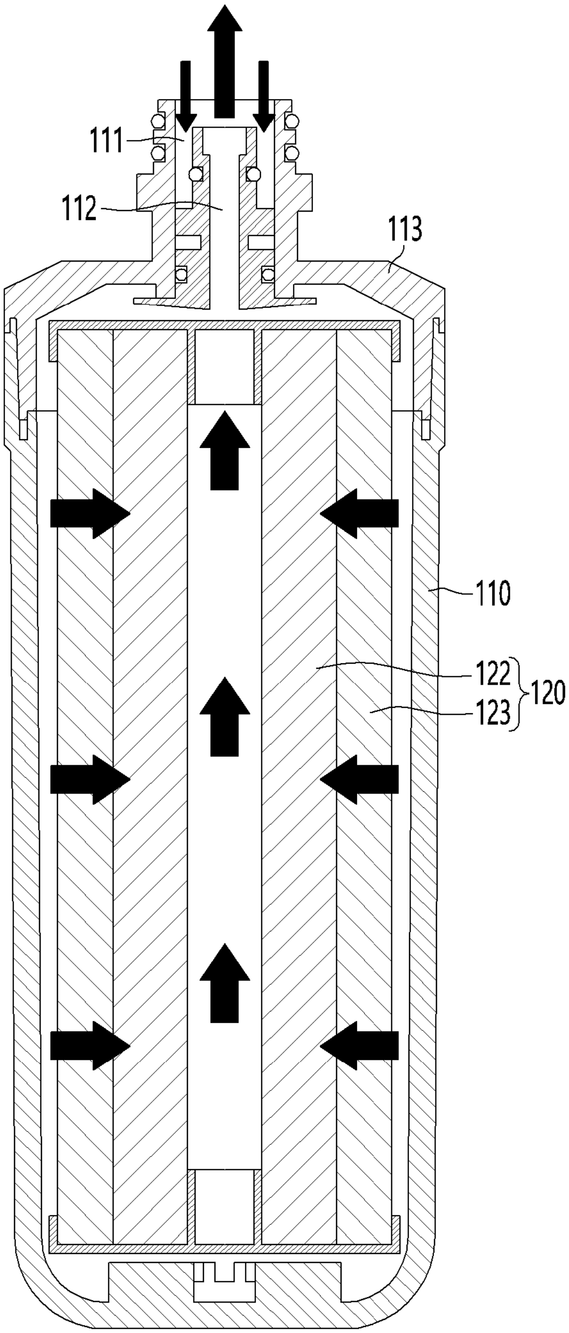
FIG. 6 is a cross-sectional view of a carbon filter according to another embodiment of the present invention.

FIG. 6 is a cross-sectional view of a carbon filter according to another embodiment of the present invention. As shown in FIG. 6, the filter module 120, which is a main component of the present invention, may include a plurality of carbon blocks. For example, the carbon blocks include a first carbon block 122 disposed inside, and a second carbon block 123 disposed to surround the outside of the first carbon block 122.

An outer diameter of the first carbon block 122 and an inner diameter of the second carbon block 123 may be the same.

The first carbon block 122 and the second carbon block 123 may have different composition ratios.

Third Embodiment

The first carbon block may be prepared by containing 10% to 20% by weight of the activated carbon, 13% to 23% by weight of the binder, 10% to 57% by weight of the ferric hydroxide, and 10% to 57% by weight of the titanium oxide.

The second carbon block may be prepared by containing 23% to 33% by weight of the activated carbon, 13% to 23% by weight of the binder, 8% to 46% by weight of the ferric hydroxide, and 8% to 46% by weight of the titanium oxide.

The first carbon block 122 may have a weight of 90 g to 120 g. The first carbon block 122 may be prepared by containing 9 g to 42 g of activated carbon, 12 g to 48 g of a binder, 9 g to 120 g of ferric hydroxide, and 9 g to 120 g of titanium oxide.

The second carbon block 123 may have a weight of 85 g to 120 g. The first carbon block 122 may be prepared by containing 20 g to 69 g of activated carbon, 11 g to 48 g of a binder, 7 g to 97 g of ferric hydroxide, and 7 g to 97 g of titanium oxide.

Fourth Embodiment

The second carbon block may be prepared by containing 25% to 35% by weight of the activated carbon, 13% to 23% by weight of the binder, 1% to 10% by weight of the ferric hydroxide, 1% to 10% by weight of the titanium oxide, and 37% to 47% by weight of the zero valent iron.

The first carbon block may be prepared by containing 25% to 35% by weight of the activated carbon, 13% to 23% by weight of the binder, 10% to 20% by weight of the ferric hydroxide, and 32% to 42% by weight of the titanium oxide.

The first carbon block 122 may have a weight of 80 g to 200 g. The first carbon block 122 may be prepared by containing 20 g to 70 g of activated carbon, 10 g to 46 g of a binder, 8 g to 40 g of ferric hydroxide, and 26 g to 84 g of titanium oxide.

The second carbon block 123 may have a weight of 60 g to 190 g. The carbon block 121 may be prepared by containing 15 g to 67 g of activated carbon, 8 g to 44 g of a binder, 1 g to 19 g of ferric hydroxide, 1 g to 19 g of titanium oxide, and 37 g to 47 g of zero valent iron.

The filter for the water purifier may include a plurality of carbon filters 100 which are shown in FIG. 6 and disposed in series.

Figure 7:
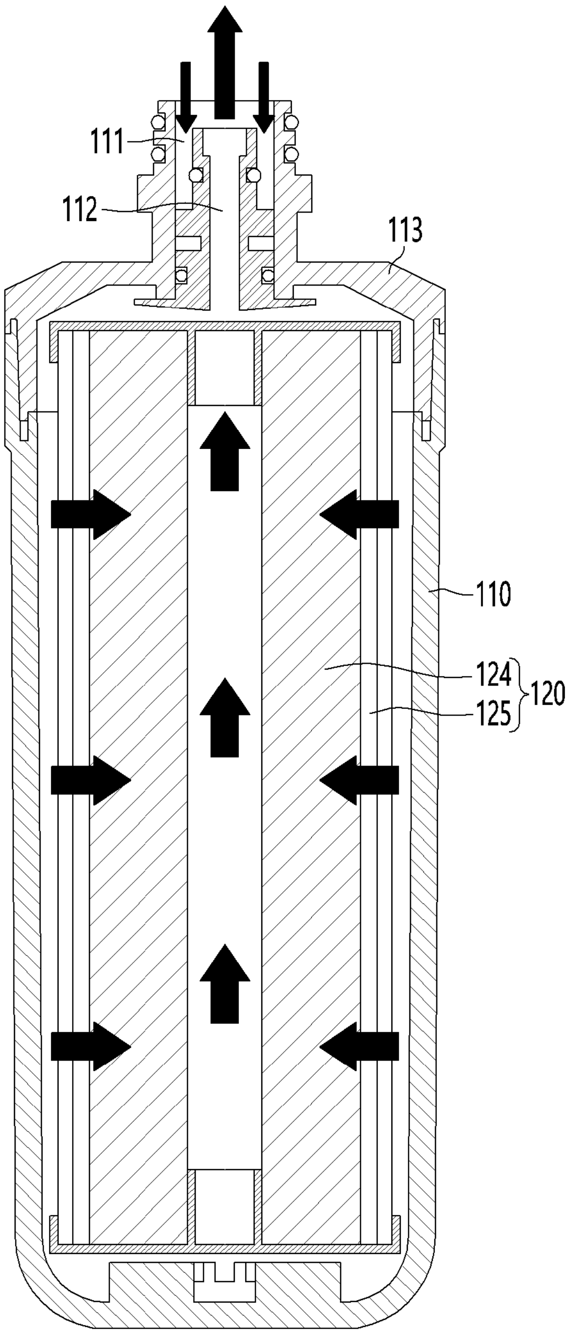
FIG. 7 is a cross-sectional view of a carbon filter according to another embodiment of the present invention.
Figure 8:
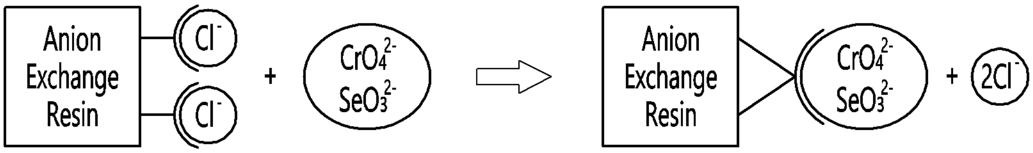
FIG. 8 is a view illustrating a mechanism in which chromium (Cr) and selenium (Se) are removed from an anion exchange resin nonwoven fabric.

FIG. 7 is a cross-sectional view of a carbon filter according to another embodiment of the present invention. FIG. 8 is a view illustrating a mechanism in which chromium (Cr) and selenium (Se) are removed from an anion exchange resin nonwoven fabric.

Referring to FIG. 7, the carbon filter 100 may include a carbon block 124 and an anion exchange resin nonwoven fabric 125 surrounding the outside of the carbon block 124.

When the anion exchange resin nonwoven fabric 125 is provided outside the carbon block 124 as described above, raw water introduced into the carbon filter 100 passes through the anion exchange resin nonwoven fabric 125 and then passes through the carbon block 124.

When the raw water passes through the anion exchange resin nonwoven fabric 125, heavy metals such as chromium (Cr) and selenium (Se) in the water may be removed through ion exchange as shown in FIG. 8.

The anion exchange resin nonwoven fabric 125 may be provided in multiple layers to improve heavy metal removal efficiency.

In this embodiment (FIG. 7), the carbon block 124 may be prepared by containing 20% to 28% by weight of the activated carbon, 13% to 23% by weight of the binder, 14% to 24% by weight of the iron hydroxide, and 33% to 43% by weight of the titanium oxide.

The carbon block 124 may have a weight of 160 g to 300 g. The first carbon block 122 may be prepared by containing 32 g to 84 g of activated carbon, 21 g to 69 g of a binder, 22 g to 72 g of ferric hydroxide, and 53 g to 129 g of titanium oxide.

According to the above description, raw water introduced into the carbon filter 100 sequentially passes through the anion exchange resin nonwoven fabric 125 and the carbon block 124 and then is discharged to the outside of the carbon filter 100.

The filter for the water purifier may include a plurality of carbon filters 100 which are shown in FIG. 7 and disposed in series.

Figure 9:
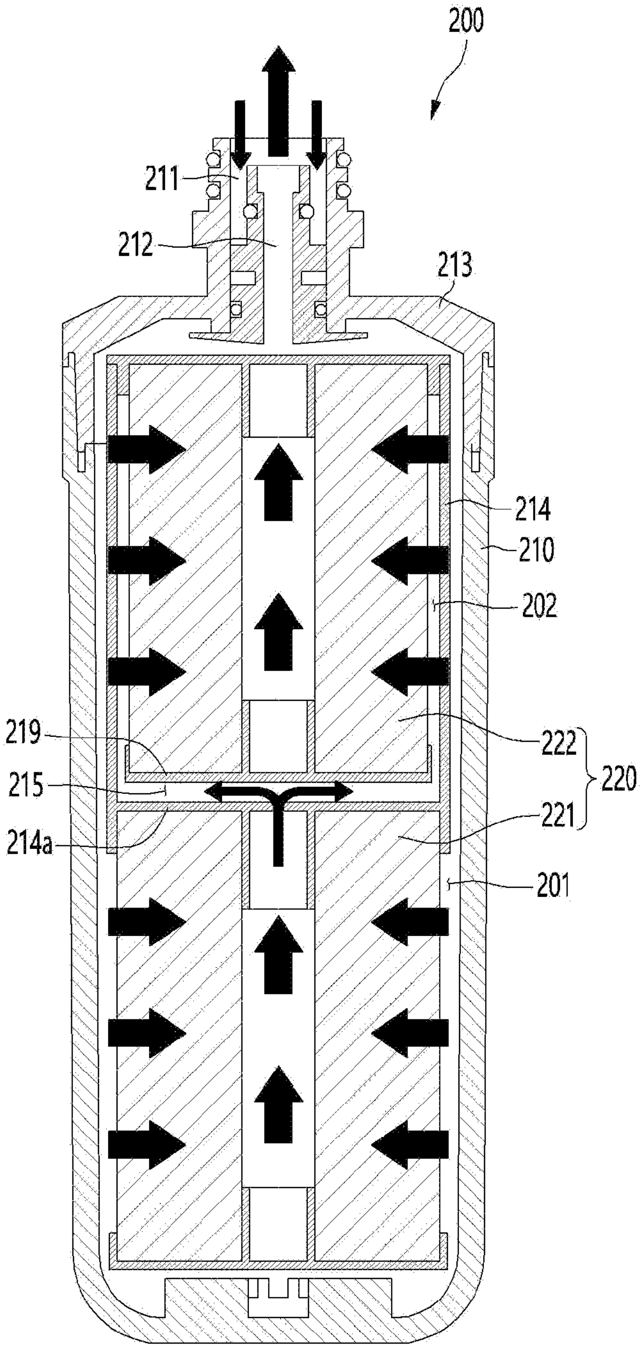
FIG. 9 is a cross-sectional view of a composite filter according to an embodiment of the present invention.
Figure 10:
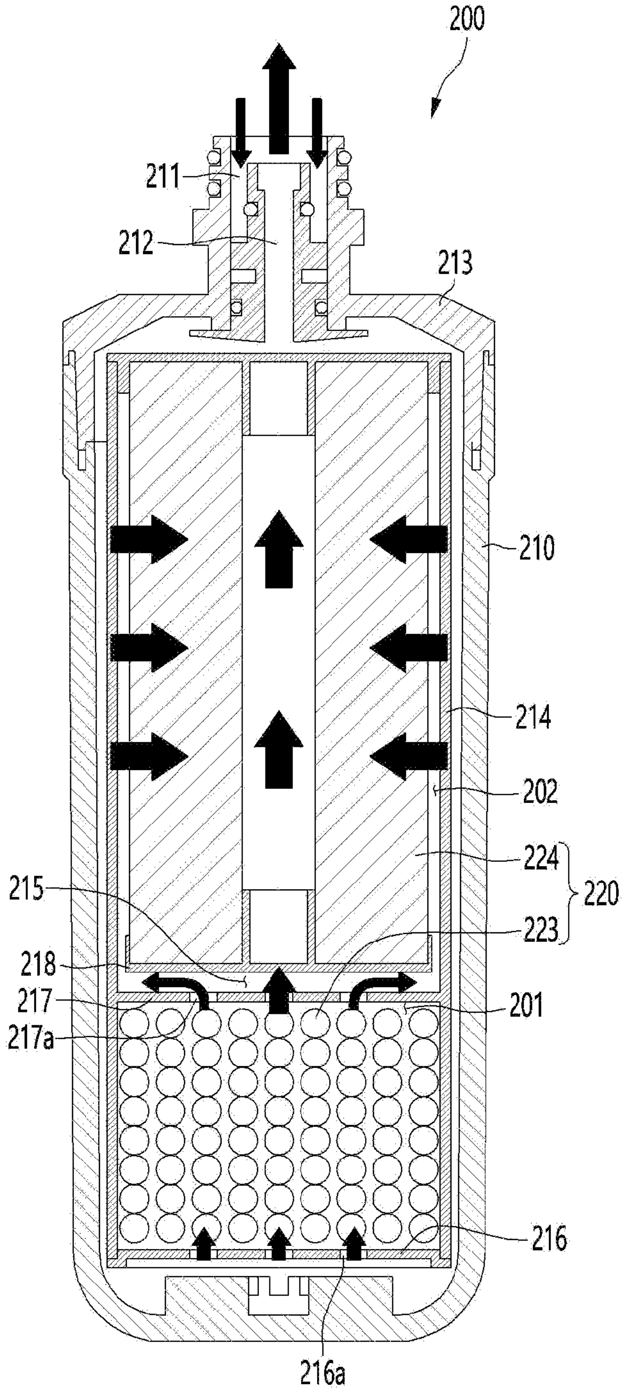
FIG. 10 is a cross-sectional view of a composite filter according to another embodiment of the present invention.

FIG. 9 is a cross-sectional view of a composite filter according to an embodiment of the present invention. FIG. 10 is a cross-sectional view of a composite filter according to another embodiment of the present invention.

A filter for a water purifier according to another embodiment of the present invention may include the composite filter 200 including a carbon block 221 having a hollow tube shape. The composite filter 200 may include a filter housing 210 and a filter module 220.

The filter housing 210 may include an inlet 211 and an outlet 212. That is, water required to be purified is introduced through the inlet 211, and the purified water is discharged through the outlet 212. Thus, water is purified by the filter module 220 disposed between the inlet 211 and the outlet 212 while flowing between the inlet 211 and the outlet 212.

The filter housing 210 may define a space in which the filter module 220 is accommodated and may include an upper cap 213 in which the inlet 211 and the outlet 212 are provided. In this example, a space portion of the filter housing 210 may communicate with the outside through the inlet 211 and the outlet 212 of the upper cap 213.

When the upper cap 213 is provided as described above, the filter module 220 may be easily mounted in the space portion of the filter housing 210 by opening the upper cap 213, and thus the filter module 220 may be easily replaced.

Water introduced into the filter housing 210 through the inlet 211 may be purified while passing through the filter module 220. That is, foreign substances (e.g., heavy metals) contained in raw water such as tap water may be removed while passing through the filter module 220.

According to the present embodiment, a filter for a water purifier that is excellent in removing the heavy metals in water, and a water purifier having the same may be provided.

The filter module 220 may include a carbon block 221, 222 prepared by mixing activated carbon, a binder, iron hydroxide, and titanium oxide to mold a mixture into a hollow block shape.

Referring to FIGS. 9 to 10, an inner space of the filter housing 210 may include a first space portion 201 which is defined at a lower portion and into which water introduced into the filter housing 210 is introduced and a second space portion 202 which is defined above the first space portion 201 and into which the water passing through the first space portion 201 is introduced.

The carbon blocks 221 and 222 may also include a third carbon block 221 accommodated in the first space portion 201 and a fourth carbon block 222 accommodated in the second space portion 202. The third carbon block 221 and the fourth carbon block 222 may have different composition ratios.

Fifth Embodiment

The third carbon block 221 may be prepared by containing 20% to 30% by weight of the activated carbon, 13% to 23% by weight of the binder, 29% to 39% by weight of the iron hydroxide, and 18% to 28% by weight of the titanium oxide.

The fourth carbon block 222 may be prepared by containing 20% to 30% by weight of the activated carbon, 13% to 23% by weight of the binder, 12% to 22% by weight of the iron hydroxide, and 35% to 45% by weight of the titanium oxide.

Sixth Embodiment

The third carbon block 221 may be prepared by containing 18% to 28% by weight of the activated carbon, 13% to 23% by weight of the binder, 9% to 15% by weight of the iron hydroxide, 18% to 28% by weight of the titanium oxide, and 15% to 25% by weight of the zero valent iron.

The fourth carbon block 222 may be prepared by containing 20% to 30% by weight of the activated carbon, 13% to 23% by weight of the binder, 10% to 20% by weight of the iron hydroxide, and 37% to 47% by weight of the titanium oxide.

The third carbon block 221 may have a weight of 75 g to 170 g. The carbon block 121 may be prepared by containing 14 g to 48 g of activated carbon, 10 g to 39 g of a binder, 7 g to 26 g of ferric hydroxide, 11 g to 48 g of titanium oxide, and 11 g to 43 g of zero valent iron.

The fourth carbon block 222 may have a weight of 70 g to 130 g. The first carbon block 122 may be prepared by containing 14 g to 39 g of activated carbon, 9 g to 30 g of a binder, 7 g to 26 g of ferric hydroxide, and 48 g to 61 g of titanium oxide.

An inner cover 214 may be provided inside the filter housing 210 to partition the first space portion 201 from the second space portion 202. An inner space of the inner cover 214 defines the second space portion 202.

Referring to FIG. 9, the water introduced into the filter housing 210 flows downward from an upper side through a passage provided between an inner wall of the filter housing 210 and an outer wall of the inner cover 214 and then is introduced into the first space portion 201 of the filter housing 210.

Thereafter, the water flows from the outside to the inside of the third carbon block 221 disposed in the first space portion 201 to flow upward from a lower side through a hollow of the third carbon block 221.

The water flowing to the upper side of the third carbon block 221 is introduced into the second space portion 202 through an auxiliary passage 215 communicating with the hollow of the third carbon block 221.

The water may flow from the outside to the inside of the fourth carbon block 222 disposed in the second space portion 202 to flow upward through a hollow of the fourth carbon block 222 and then be discharged to the outside of the filter housing 210.

The auxiliary passage 215 may be integrated with a lower end of the inner cover 214 and may be defined by a space between a filter bracket 214*a* that supports an upper end of the third carbon block 221 and a filter bracket 219 that supports a lower end of the fourth carbon block 222.

An outer diameter of the third carbon block 221 may be greater than an outer diameter of the fourth carbon block 222.

Referring to FIG. 10, the first space portion 201 may be filled with an anion exchange resin 223 in the form of particles, and the carbon block 224 may be accommodated in the second space portion 202.

In this embodiment (FIG. 10), the carbon block 224 may be prepared by containing 25% to 30% by weight of the activated carbon, 13% to 23% by weight of the binder, 27% to 37% by weight of the iron hydroxide, and 25% to 30% by weight of the titanium oxide.

As described above, the inner cover 214 may be provided inside the filter housing 210 to partition the first space portion 201 from the second space portion 202. The inner cover 214 has a bottom surface 216 defined at a lower end thereof, and a plurality of through-holes 216*a* are defined in the bottom surface 216. The inner cover 214 defines an intermediate wall 217 spaced apart from the bottom surface 216 at an upper side of the bottom surface 216. A plurality of through-holes 217*a* are defined in the intermediate wall 217.

A space between the bottom surface 216 and the intermediate wall 217 defines the first space portion 201.

Referring to FIG. 10, the water introduced into the filter housing 210 flows downward from an upper side through a passage provided between an inner wall of the filter housing 210 and an outer wall of the inner cover 214 and then is introduced into the first space portion 201 through the through-hole 216*a* of the bottom surface 216.

Thereafter, while passing through the anion exchange resin 223 in the form of particles disposed in the first space portion 201, the water flows upward from the lower side.

The water flowing to the upper side of the anion exchange resin 223 is discharged through the through-hole 217*a* of the intermediate wall 217 and then is introduced into the second space portion 202 through the auxiliary passage 215 provided between the intermediate wall 217 and the filter bracket 218 supporting the lower end of the carbon block 224.

Thereafter, the water may flow from the outside to the inside of the carbon block 224 disposed in the second space portion 202 to flow upward through a hollow of the carbon block 224 and then be discharged to the outside of the filter housing 210.

As described above, when the third carbon block 221 and the fourth carbon block 222 are disposed in a line in one filter housing, or the anion exchange resin 223 and the carbon block 224 are disposed in a line in one filter housing, a flow rate of the purified water may be maintained while improving filtration efficiency.

It may not be necessary to expand the filter installation space defined in the water purifier, and also the filter may be just applied by simply replacing the existing filter.

The filter may be reduced in volume to improve space utilization, and also slimming of the water purifier may be achieved.

The raw water introduced into the water purifier may be purified while passing through at least one of the carbon filter 100 or the composite filter 200.

When activated carbon, binder, ferric hydroxide, and titanium oxide are mixed through the carbon block, nine kinds of heavy metals (i.e., mercury, lead, copper, aluminum, iron, cadmium, arsenic, manganese and zinc) may be removed.

Mercury, lead, iron, aluminum, cadmium, arsenic, and copper are removed by ferric hydroxide in the carbon block, and manganese and zinc may be removed by titanium oxide in the carbon block.

For reference, in the case of manganese and zinc contained in water, ions may be adsorbed to titanium dioxide ($TiO_2$) through a chemical reaction such as following Formula (14) and may be removed in water.

Formula (14)

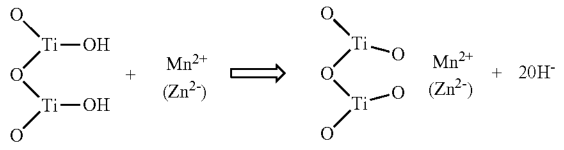

Chelation

In the example of chromium and selenium, ions may be adsorbed to titanium dioxide ($TiO_2$) through a chemical reaction such as following Formula (15) and may be removed in water.

Formula (15)

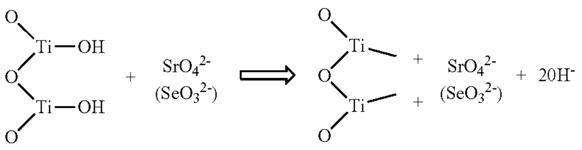

Chelation

Figure 11:
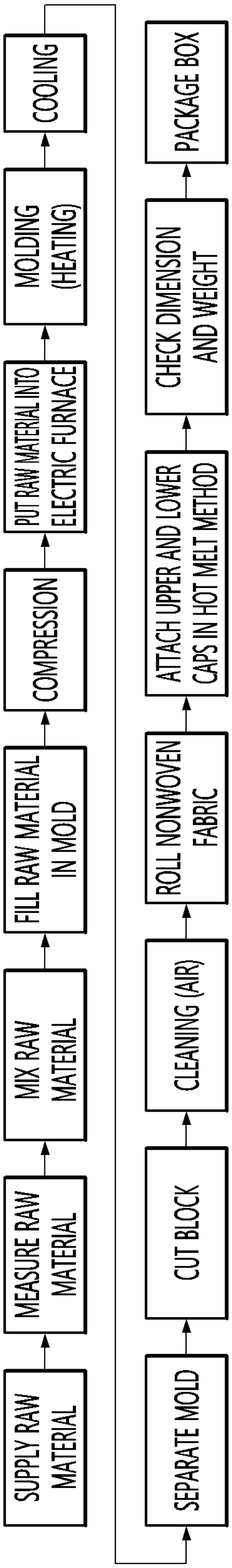
FIG. 11 is a block diagram for explaining a process of preparing a carbon block applied to the filter according to the present invention.

FIG. 11 is a block diagram for explaining a process of preparing a carbon block applied to the filter according to the present invention. Each material constituting the carbon block is mixed at a moderate rate to a carbon block mixture. The carbon black mixture may be prepared by mixing the activated carbon, the binder, the iron hydroxide, and the titanium oxide at various ratios.

The evenly mixed carbon block mixture is then filled in the mold. A compression process is then performed on the carbon block mixture. The compressed carbon block mixture is put into an electric furnace.

Heating may be performed. In the heating process, the binder (for example, polyethylene (PE)) is melted, the activated carbon, ferric hydroxide, titanium oxide, and the binder are integrally coupled, and the carbon block provided in the form of a hollow tube having overall rigidity may be molded.

After the heating, cooling is performed, and when the cooling is completed, the mold is separated.

The hollow tube-shaped carbon block separated from the mold may be cut to a unit length. The cut carbon block is cleaned through injection of compressed air.

Thereafter, the nonwoven fabric around the carbon block, and the top and bottom caps are attached in a hot melt method. Thereafter, a dimensions and weight is checked, and if there are no abnormalities, packaging is performed.

According to the present invention as described above, there may be the effect capable of reliably removing the heavy metals in water containing chromium (Cr), selenium (Se), manganese (Mn), and zinc (Zn) in water.

According to the present invention, there may be the effect capable of removing eleven kinds of heavy metals (such as lead, mercury, arsenic, cadmium, iron, aluminum, copper, manganese, zinc, chromium, and selenium) in water while securing the treatment capacity.

The invention claimed is:

1. A filter for a liquid purifier, comprising:

a filter housing having an inlet to receive liquid and an outlet to discharge the liquid; and a filter module provided at the filter housing, and configured to purify liquid received through the inlet, and to provide the purified liquid to discharge from the outlet, wherein the filter module includes at least one carbon block having a hollow tube shape, the at least one carbon block provided based on activated carbon, a binder, ferric hydroxide, titanium dioxide or titanate, and zero valent iron, and wherein the at least one carbon block contains 13% to 23% by weight of the binder; and an anion exchange resin nonwoven fabric configured to surround the at least one carbon block.

2. The filter according to claim 1, wherein the activated carbon is 25% to 35% by weight of the at least one carbon block, the ferric oxide is 5% to 15% by weight of the at least one carbon block, the titanium dioxide or titanate is 18% to 28% by weight of the at least one carbon block, and the zero valent iron is 10% to 20% by weight of the at least one carbon block.

3. The filter according to claim 1, wherein the at least one carbon block includes a first carbon block and a second carbon block disposed to surround an outside of the first carbon block.

4. The filter according to claim 3, wherein an outer diameter of the first carbon block contacts an inner diameter of the second carbon block.

5. The filter according to claim 3, wherein a composition ratio of the first carbon block is different than a composition ratio of the second carbon block.

6. The filter according to claim 1, wherein an inner space of the filter housing includes:

a first space portion disposed in a lower portion, and configured to receive the liquid introduced into the filter housing; and a second space portion disposed above the first space portion, and configured to receive the liquid passing through the first space portion.

7. The filter according to claim 6, wherein the at least one carbon block includes a third carbon block accommodated in the first space portion and a fourth carbon block accommodated in the second space portion.

8. The filter according to claim 7, wherein a composition ratio of the third carbon block is different than a composition ratio of the fourth carbon block.

9. A filter for a liquid purifier, comprising:

a filter housing having an inlet to receive liquid and an outlet to discharge the liquid; and a filter module provided at the filter housing, and configured to purify liquid received through the inlet, and to provide the purified liquid to discharge from the outlet, wherein the filter module includes at least one carbon block having a hollow tube shape, the at least one carbon block provided based on activated carbon, a binder, ferric hydroxide, titanium dioxide or titanate, and zero valent iron, wherein the at least one carbon block contains 13% to 23% by weight of the binder, wherein the at least one carbon block includes a first carbon block and a second carbon block disposed to surround an outside of the first carbon block, wherein a composition ratio of the first carbon block is different than a composition ratio of the second carbon block, and wherein the activated carbon is 10% to 20% by weight of the first carbon block, the binder is 13% to 23% by weight of the first carbon block, the ferric hydroxide is 10% to 57% by weight of the first carbon block, and the titanium dioxide or titanate is 10% to 57% by weight of the first carbon block, and the activated carbon is 23% to 33% by weight of the second carbon block, the binder is 13% to 23% by weight of the ferric hydroxide, 8% to 46% by weight of the second carbon block, and the titanium dioxide or titanate is 8% to 46% by weight of the second carbon block.

10. A filter for a liquid purifier, comprising:

a filter housing having an inlet to receive liquid and an outlet to discharge the liquid; and a filter module provided at the filter housing, and configured to purify liquid received through the inlet, and to provide the purified liquid to discharge from the outlet, wherein the filter module includes at least one carbon block having a hollow tube shape, the at least one carbon block provided based on activated carbon, a binder, ferric hydroxide, titanium dioxide or titanate, and zero valent iron, wherein the at least one carbon block contains 13% to 23% by weight of the binder, wherein the at least one carbon block includes a first carbon block and a second carbon block disposed to surround an outside of the first carbon block, wherein a composition ratio of the first carbon block is different than a composition ratio of the second carbon block, and wherein the activated carbon is 25% to 35% by weight of the second carbon block, the binder is 13% to 23% by weight of the second carbon block, the ferric oxide is 1% to 10% by weight of the second carbon block, the titanium dioxide or titanate is 1% to 10% by weight of the second carbon block, and the zero valent iron is 37% to 47% by weight of the second carbon block.

11. The filter according to claim 10, wherein the activated carbon is 25% to 35% by weight of the first carbon block, the binder is 13% to 23% by weight of the first carbon block, the ferric hydroxide is 10% to 20% by weight of the first carbon block, and titanium dioxide or titanate is 32% to 42% by weight of the first carbon block.

12. A filter for a liquid purifier, comprising:

a filter housing having an inlet to receive liquid and an outlet to discharge the liquid; and a filter module provided at the filter housing, and configured to purify liquid received through the inlet, and to provide the purified liquid to discharge from the outlet, wherein the filter module includes at least one carbon block having a hollow tube shape, the at least one carbon block provided based on activated carbon, a binder, ferric hydroxide, titanium dioxide or titanate, and zero valent iron, wherein the at least one carbon block contains 13% to 23% by weight of the binder, wherein an inner space of the filter housing includes:

a first space portion disposed in a lower portion, and configured to receive the liquid introduced into the filter housing; and a second space portion disposed above the first space portion, and configured to receive the liquid passing through the first space portion, wherein the at least one carbon block includes a third carbon block accommodated in the first space portion and a fourth carbon block accommodated in the second space portion, wherein a composition ratio of the third carbon block is different than a composition ratio of the fourth carbon block, and wherein the activated carbon is 10% to 20% by weight of the third carbon block, the binder is 13% to 23% by weight of the third carbon block, the ferric hydroxide is 29% to 39% by weight of the third carbon block, and the titanium dioxide or titanate is 18% to 28% by weight of the third carbon block, and the activated carbon block is 20% to 30% by weight of the fourth carbon block, the binder is 13% to 23% by weight of the fourth carbon block, the ferric oxide is 12% to 22% by weight of the fourth carbon block, and the titanium dioxide or titanate is 35% to 45% by weight of the fourth carbon block.

13. A filter for a liquid purifier, comprising:

a filter housing having an inlet to receive liquid and an outlet to discharge the liquid; and a filter module provided at the filter housing, and configured to purify liquid received through the inlet, and to provide the purified liquid to discharge from the outlet, wherein the filter module includes at least one carbon block having a hollow tube shape, the at least one carbon block provided based on activated carbon, a binder, ferric hydroxide, titanium dioxide or titanate, and zero valent iron, and wherein the at least one carbon block contains 13% to 23% by weight of the binder, wherein an inner space of the filter housing includes:

a first space portion disposed in a lower portion, and configured to receive the liquid introduced into the filter housing; and a second space portion disposed above the first space portion, and configured to receive the liquid passing through the first space portion, wherein the at least one carbon block includes a third carbon block accommodated in the first space portion and a fourth carbon block accommodated in the second space portion, wherein a composition ratio of the third carbon block is different than a composition ratio of the fourth carbon block, and wherein the activated carbon is 18% to 28% by weight of the third carbon block, the binder is 13% to 23% by weight of the third carbon block, the ferric oxide is 9% to 15% by weight of the third carbon block, the titanium dioxide or titanate is 18% to 28% by weight of the third carbon block, and the zero valent iron is 15% to 25% by weight of the third carbon block.

14. The filter according to claim 13, wherein the activated carbon is 20% to 30% by weight of the fourth carbon block, the binder is 13% to 23% by weight of the fourth carbon block, the ferric hydroxide is 10% to 20% by weight of the fourth carbon block, and the titanium dioxide or titanate is 37% to 47% by weight of the fourth carbon block.

15. A filter for a liquid purifier, comprising:

a filter housing having an inlet to receive liquid and an outlet to discharge the liquid; and a filter module provided at the filter housing, and configured to purify liquid received through the inlet, and to provide the purified liquid to discharge from the outlet, wherein the filter module includes at least one carbon block having a hollow tube shape, the at least one carbon block provided based on activated carbon, a binder, ferric hydroxide, titanium dioxide or titanate, and zero valent iron, wherein the at least one carbon block contains 13% to 23% by weight of the binder, wherein an inner space of the filter housing includes:

a first space portion disposed in a lower portion, and configured to receive the liquid introduced into the filter housing; and a second space portion disposed above the first space portion, and configured to receive the liquid passing through the first space portion, wherein the first space portion is filled with an anion exchange resin in a form of particles, and wherein the at least one carbon block is accommodated in the second space portion.

16. The filter according to claim 15, wherein the activated carbon is 25% to 30% by weight of the at least one carbon block, the ferric hydroxide is 27% to 37% by weight of the at least one carbon block, and the titanium dioxide or titanate is 25% to 30% by weight of the at least one carbon block.

17. A liquid purifier comprising at least one liquid purifier filter to provide purified liquid from raw liquid, wherein the at least one liquid purifier filter is the filter of claim 1.

18. A liquid purifier comprising at least one liquid purifier filter to provide purified liquid from raw liquid, wherein the at least one liquid purifier filter is the filter of claim 9.

19. A liquid purifier comprising at least one liquid purifier filter to provide purified liquid from raw liquid, wherein the at least one liquid purifier filter is the filter of claim 10.

20. A liquid purifier comprising at least one liquid purifier filter to provide purified liquid from raw liquid, wherein the at least one liquid purifier filter is the filter of claim 12.

21. A liquid purifier comprising at least one liquid purifier filter to provide purified liquid from raw liquid, wherein the at least one liquid purifier filter is the filter of claim 13.

22. A liquid purifier comprising at least one liquid purifier filter to provide purified liquid from raw liquid, wherein the at least one liquid purifier filter is the filter of claim 15.

* * * * *